United States Patent [19]

Reichstein

[11] 4,030,163
[45] June 21, 1977

[54] CUTTER FOR REMOVING A TOUGH SURFACE LAYER FROM PIECES OF MATERIAL

[75] Inventor: Erik Laurits Reichstein, Frederikshavn, Denmark

[73] Assignee: Arenco AB, Vastra Frolunda, Sweden

[22] Filed: May 29, 1975

[21] Appl. No.: 581,834

[30] Foreign Application Priority Data

May 31, 1974 Denmark ........................... 2966/74

[52] U.S. Cl. ...................................... 17/50; 17/62
[51] Int. Cl.² ..................................... A22C 25/02
[58] Field of Search ............................ 17/62, 21–50, 17/66, 67, 69, 61; 99/589, 540; 83/443; 69/13; 30/357

[56] References Cited
UNITED STATES PATENTS

| | | | |
|---|---|---|---|
| 41,583 | 2/1864 | Stearns | 69/13 |
| 1,901,798 | 3/1933 | Boomer | 17/21 |
| 2,477,289 | 7/1949 | De Moss | 17/21 |
| 3,249,139 | 5/1966 | Runnells, Jr. et al. | 99/589 |
| 3,513,893 | 5/1970 | Townsend | 17/62 |
| 3,898,923 | 8/1975 | Grieder | 17/62 |

Primary Examiner—Russell R. Kinsey
Assistant Examiner—James D. Hamilton
Attorney, Agent, or Firm—Dressler, Goldsmith, Clement, Gordon & Shore, Ltd.

[57] ABSTRACT

A cutter for removing a tough surface layer from pieces of material, more specifically for skinning fish, particularly fillets of fish. By means of a roller, the pieces of material are conveyed past a stationary cutter which removes the surface layer by cutting in between the latter and the piece of material, the surface layer passing between cutter and roller while the piece of material passes above the cutter. The cutter has adjacent its edge a projecting wall portion extending transversely of the travelling direction of the pieces of material and away from the cutter side opposite the roller.

12 Claims, 5 Drawing Figures

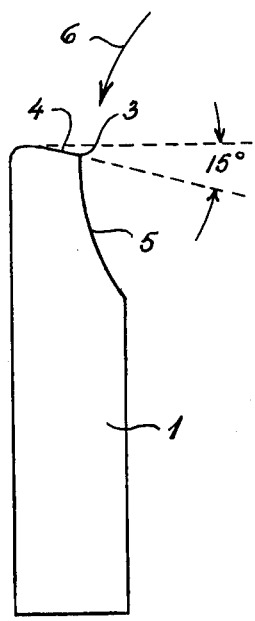
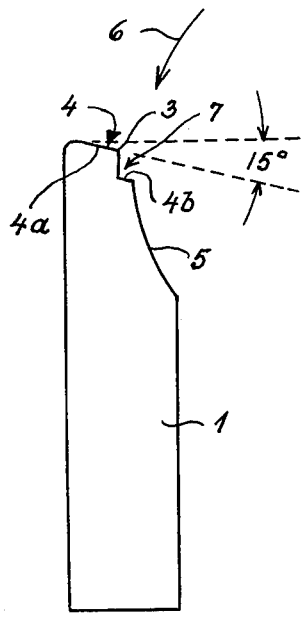
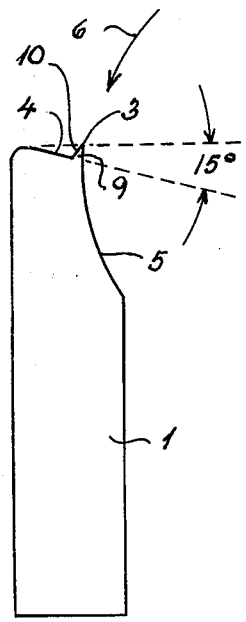
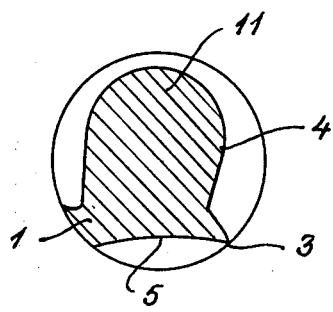

4,030,163

CUTTER FOR REMOVING A TOUGH SURFACE LAYER FROM PIECES OF MATERIAL

BACKGROUND OF THE INVENTION

The present invention relates to a cutter for removing a tough surface layer from pieces of material, more specifically for skinning fish, particularly fillets of fish, which comprises conveying by means of a roller the pieces of material past a stationary cutter which removes the surface layer by cutting in between the latter and the piece of material as the surface layer passes between cutter and roller while the piece of material passes above the cutter.

SUMMARY OF THE INVENTION

The object of the invention is to provide a cutter by means of which the separation is rendered particularly effective as the cutter must be capable of cutting into the leading edge of the arriving piece of material with great ease and accuracy to thereby effectively separate the surface layer from the piece of material.

According to the invention, this object is achieved by the cutter having adjacent its edge a projecting wall portion extending transversely of the travelling direction of the pieces of material and away from the cutter side opposite the roller.

The leading edge of an arriving piece of material will encounter the wall portion which will then to some extent check the advance of the piece, thereby forcing at least part of the leading edge of the piece against the cutting edge to enable the latter effectively and accurately to cut in between the surface layer and the piece of material itself. From the very first this ensures accurate removal of the surface layer. The cutting of the surface layer continues and at the same time the part of the piece of material freed from the layer is lifted above the wall portion, which has the added advantage of facilitating continued cutting.

It is thus no longer required to clamp the leading end of the arriving piece of material with surface layer between cutter and roller by lifting the cutter away from the roller and after insertion of said end again clamp the cutter against the roller as is necessary in prior art cutters of the aforesaid type. Not only will this simplify the construction of the cutting device but also involve substantial rationalization as with one and the same cutter it becomes possible to process a plurality of pieces of material placed side by side, notwithstanding their respective size and position. No such procedure is possible in the prior art in which, owing to the necessary clamping, only a single piece of material or a single row of pieces can be processed at a time. Besides, the waste arising in connection with the prior art from the clamped piece where the surface layer is left is eliminated.

According to the invention, an imagined extension of the wall portion where it intersects the jacket of the roller could form an angle of less than 90° to the surface of the roller. This will ensure accurate guidance of the leading edge of the arriving piece of material toward the cutting edge.

According to the invention, the wall portion may be stepped with the edge formed on a part of the wall portion spaced rearwardly from the remainder of the wall portion, viewed in the travelling direction of the pieces of material. This embodiment is particularly advantageous for processing relatively rigid pieces, such as stiff fresh fish, or pieces having a thick surface layer, such as thick-skinned fillets of fish, as during the feeding part of the piece or its surface layer will be urged into the gap formed between cutter and roller according to this embodiment, thereby preventing the material from slipping above the cutter without the surface layer being removed.

According to the invention, the wall portion may also be formed to include at its end facing the roller a projecting rib having an outer edge serving as cutting edge. This embodiment may be advantageous, for instance in the case of small soft fillets of fish, as it is possible to obtain an improved incision effect. According to the invention, the wall portion may form an obtuse angle to the top side of the rib to facilitate carrying away the piece of material freed from its surface layer.

Finally, according to the invention, a structure using less material may be accomplished by forming the wall portion on a rib upstanding from the cutter.

BRIEF DESCRIPTION OF THE INVENTION

The invention will be further explained below with reference to the drawings in which FIG. 1 is a schematic lateral view of an embodiment of the cutter, FIG. 2 a similar view of another embodiment of the cutter, FIG. 3 a similar view of a third embodiment of the cutter, FIG. 4 an enlarged section of a fourth embodiment of the cutter, and FIG. 5 the cutter according to FIG. 1 arranged in a cutting device.

DETAILED DESCRIPTION OF THE ILLUSTRATIVE EMBODIMENTS

Figure 5:
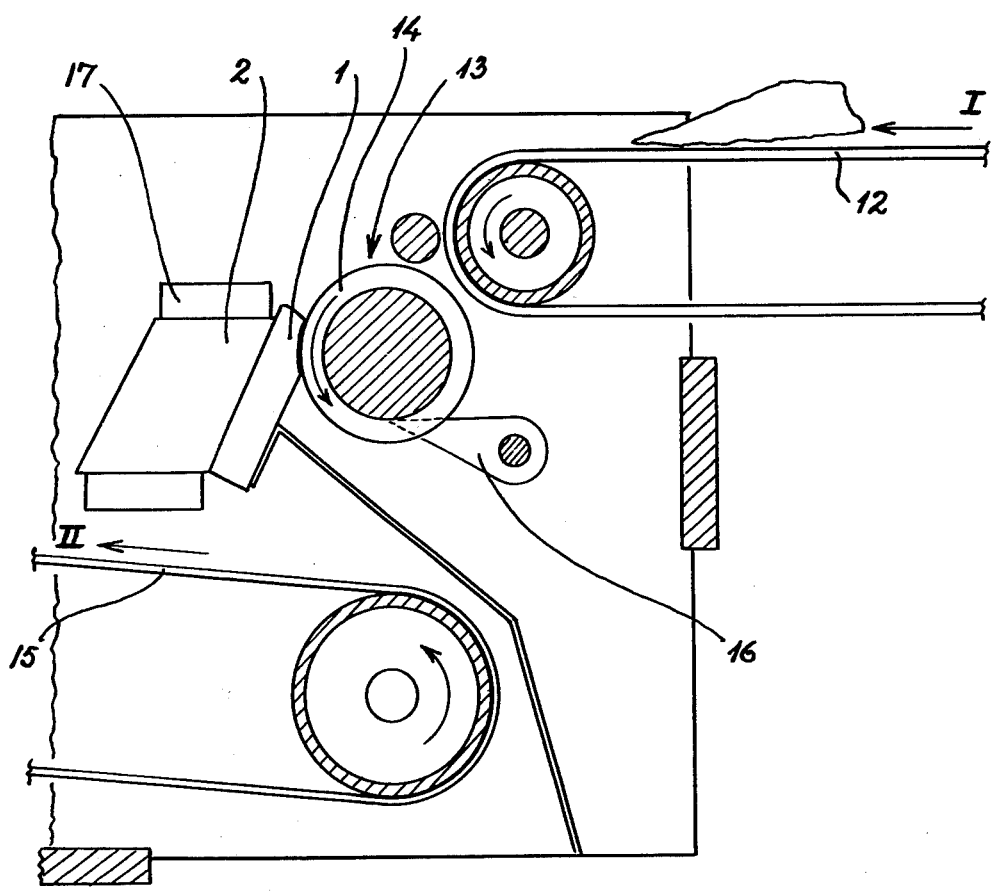

In each of the illustrated embodiments the cutter comprises a rail-like body 1 adapted by means of suitable anchoring to be arranged n a retaining means 2, see FIG. 5. Each cutter has a cutting edge 3 and adjacent the latter a projecting wall portion 4 which, when the cutter is mounted in a cutting device of the type described by way of introduction and in broad outline in connection with FIG. 5, extends transversely of the travelling direction of the pieces of material and away from the cutter side opposite the roller of the cutting device. The underside of the cutter adjoining the cutting edge 3 has an arched lower portion, the curvature of which corresponds to that of the roller.

In the embodiment illustrated in FIG. 1 the cutting edge 3 is formed by the adjoining edge of the wall portion 4 and lower portion 5.

In the embodiment illustrated in FIG. 2 the wall portion 4 is stepped as there is provided a part 4a of the wall portion which, when viewed in the travelling direction of the pieces indicated by the arrow 6, is somewhat offset to the rear of the remaining part 4b of the wall portion and whose free edge adjacent the stepping forms the cutting edge 3. The gap formed between the wall parts 4a and 4b is designated 7.

In the embodiment illustrated in FIG. 3 the wall portion 4 at its end facing the roller has a projecting rib 9 with an outer edge forming the cutting edge 3. In the shown embodiment the rib 9 is of triangular cross section, and the wall portion 4 forms an obtuse angle to the top side 10 of the rib.

In the embodiment illustrated in FIG. 4 the wall portion 4 is formed on a rib 11 upstanding from the cutter body 1, the upper part of which rib is rounded according to this embodiment.

In all the illustrated embodiments an imagined extension of the wall portion 4 where it intersects the jacket of the roller forms an angle of less than 90° (an acute angle) to the surface of the roller. In the illustrated embodiments the angle is about 1°.

The operation of the cutter appears from the section of a cutting device shown in FIG. 5. The device comprises a conveyor belt 12 for feeding pieces of material such as fillets of fish to be skinned. The belt 12 conveys the pieces to a roller 13 which has annular ribs 14 spaced throughout its length to ensure removal of the separated skins. The lower portion 5 of the cutter is adjacent the ribs 14 with a belt conveyor 15 provided below the cutter for removing the pieces of material freed from the surface layer. A finger-like scraper 16 extending inwardly between the ribs 14 serves to separate the severed skins from the roller 13.

The pieces of material are advanced with their surface layer to be removed resting on the conveyor 12. As a layer of material is transferred from the conveyor 12 to the roller 13, it is conveyed by the latter toward the cutter and, according to the thickness of the piece, at least part of its leading edge portion, more specifically the lower part thereof, will be fed against the wall portion 4 which is at an acute angle relative to the surface of the roller, i.e., which is inclined in the direction generally opposite to the direction of travel of the piece to be skinned. The wall portion 4 will then force the said edge portion of the piece, at least in the region of the surface layer, toward the cutting edge 3 to enable the latter accurately to cut in between the surface layer and the piece of material itself.

This will cause the severed surface layer to pass between the cutter and the roller 13 with the ribs 14 while the piece of material freed from the surface layer is lifted above the cutter to slide down toward the conveyor 15.

The position of the retaining means 2 in relation to the roller 13 is adjustable by means of the guide rails 17 shown schematically.

What I claim is:

1. A machine for skinning fish, comprising:
   an elongated roller having a generally cylindrical surface;
   an elongated stationary cutter positioned in the path of trvel of the fish and having a wall portion inclined in the direction generally opposite to the direction of travel of said fish toward said roller and disposed at an acute angle relative to a perpendicular extension to the surface of said roller, a cutting edge defined by said wall portion and adjacent said surface of said roller for severing and removing the skin from said fish, an arcuate lower portion adjacent said cutting edge and disposed adjacent said roller, said arcuate lower portion located at an obtuse angle to said wall portion and having an arcuate configuration generally complementing and disposed generally parallel to said surface of said roller;
   said roller constructed and arranged to feed said fish to said cutter past said cutting edge;
   said wall portion intercepting said fish and urging the leading edge portion of said fish in the region of said skin toward and into engagement with said roller and said cutting edge for promoting severance of said skin and enabling said cutting edge to cut into the fish adjacent said skin; and
   said cutting edge cooperating with said roller for guiding said severed skin between said cutter and said roller and for guidably lifting the remainder of said skinned fish above said cutter.

2. A machine for skinning fish in accordance with claim 1 wherein said wall portion includes a stepped portion having one section including said cutting edge and another section disposed substantially downstream of said one section and located between and adjacent said one section and said arcuate lower portion.

3. A machine for skinning fish in accordance with claim 1 wherein said wall portion includes a forwardly projecting rib having a generally triangular cross-sectional configuration, the end of which comprises said cutting edge.

4. A machine for skinning fish in accordance with claim 3 in which said wall portion intersects the rib at an obtuse angle.

5. A machine for skinning fish in accordance with claim 1 wherein said wall portion is disposed at an acute angle of at least about 10°.

6. A machine for skinning fish in accordance with claim 1 including retaining means for fixedly holding said cutter.

7. A machine for skinning fish, comprising:
   an elongated roller having a generally cylindrical surface;
   first conveying means for conveying fish to said roller;
   an elongated stationary cutter positioned in the path of travel of the fish and having a wall portion inclined in the direction generally opposite to the direction of travel of said fish toward said roller and disposed at an angle of at least about 10° relative to a perpendicular extension to said surface of said roller, a cutting edge defined by said wall portion for severing and removing the skin from said fish, an arcuate lower portion adjacent said cutting edge and disposed adjacent said roller, said arcuate lower portion located at an obtuse angle to said wall portion and having an arcuate configuration generally complementing and disposed parallel to said surface;
   said roller constructed and arranged to feed said fish to said cutter past said cutting edge and having annular ribs spaced along its length for enhancing removal of said severed skins;
   a finger-like scraper extending inwardly between said ribs for separating said severed skins from said roller;
   said wall portion intercepting said fish and urging the leading edge portion of said fish in the region of said skin toward and into engagement with said roller and said cutting edge for promoting severance of said skin and enabling said cutting edge to cut into the fish adjacent said skin;
   said cutting edge cooperating with said roller for guiding said severed skin between said cutter and said roller and for guidably lifting the remainder of said skinned fish above said cutter; and
   second conveying means disposed beneath said cutter for catching, removing and conveying said skinned fish which has been lifted above said cutter.

8. A method of skinning fish, comprising the steps of:

providing an elongated roller having a generally cylindrical surface;

providing an elongated cutter having a wall portion inclined in the direction generally opposite to the traveling direction of said fish toward said roller, a cutting edge defined by said wall portion, and an arcuate lower portion adjacent said cutting edge with said arcuate lower portion located at an obtuse angle to said wall portion and having an arcuate configuration generally complementing said surface of said roller;

feeding fish via said roller to said cutter past said cutting edge by advancing the fish to intercept said wall portion substantially prior to severing the skin from said fish with said cutting edge;

positioning said cutter in the path of travel of the fish, including positioning said wall portion at an acute angle relative to a perpendicular extension to said surface of said roller, positioning said cutting edge adjacent said surface of said roller and positioning said arcuate lower portion adjacent and generally parallel to said surface;

forcing the leading edge of said fish in the region of said skin toward and into engagement with said cutting edge;

cutting the fish adjacent said skin with said cutting edge so as to remove said skin from said fish;

guiding said severed skin between said cutter and said roller; and lifting the remainder of said skinned fish above said cutter;

said wall portion enhancing continued cutting of said fish.

9. A method in accordance with claim 8 including conveying the fish to said roller.

10. A method in accordance with claim 9 including the steps of removing and conveying said skinned fish which has been lifted above said cutter.

11. A method in accordance with claim 8 including scraping said severed skins from said roller.

12. A method in accordance with claim 8 wherein said wall portion is disposed at an angle of at least about 10°.

* * * * *

UNITED STATES PATENT OFFICE
CERTIFICATE OF CORRECTION

PATENT NO. : 4,030,163
DATED : June 21, 1977
INVENTOR(S) : Erik Laurits Reichstein It is certified that error appears in the above-identified patent and that said Letters Patent are hereby corrected as shown below:

Column 2, line 21, "Brief Description of the Invention" should be -- Brief Description of the Drawings --;

Column 2, line 39 "n" should be -- in --;

Column 3, line 7, "1°" should be -- 10° --;

Column 3, line 49, Claim 1, "trvl" should be -- travel --

Signed and Sealed this

Thirteenth Day of September 1977

[SEAL]

Attest:

RUTH C. MASON
Attesting Officer

LUTRELLE F. PARKER
Acting Commissioner of Patents and Trademarks